Sept. 13, 1949.                  H. E. GIBSON                    2,481,738
                                  HUMIDIFIER
Filed Jan. 26, 1948                                            2 Sheets-Sheet 1
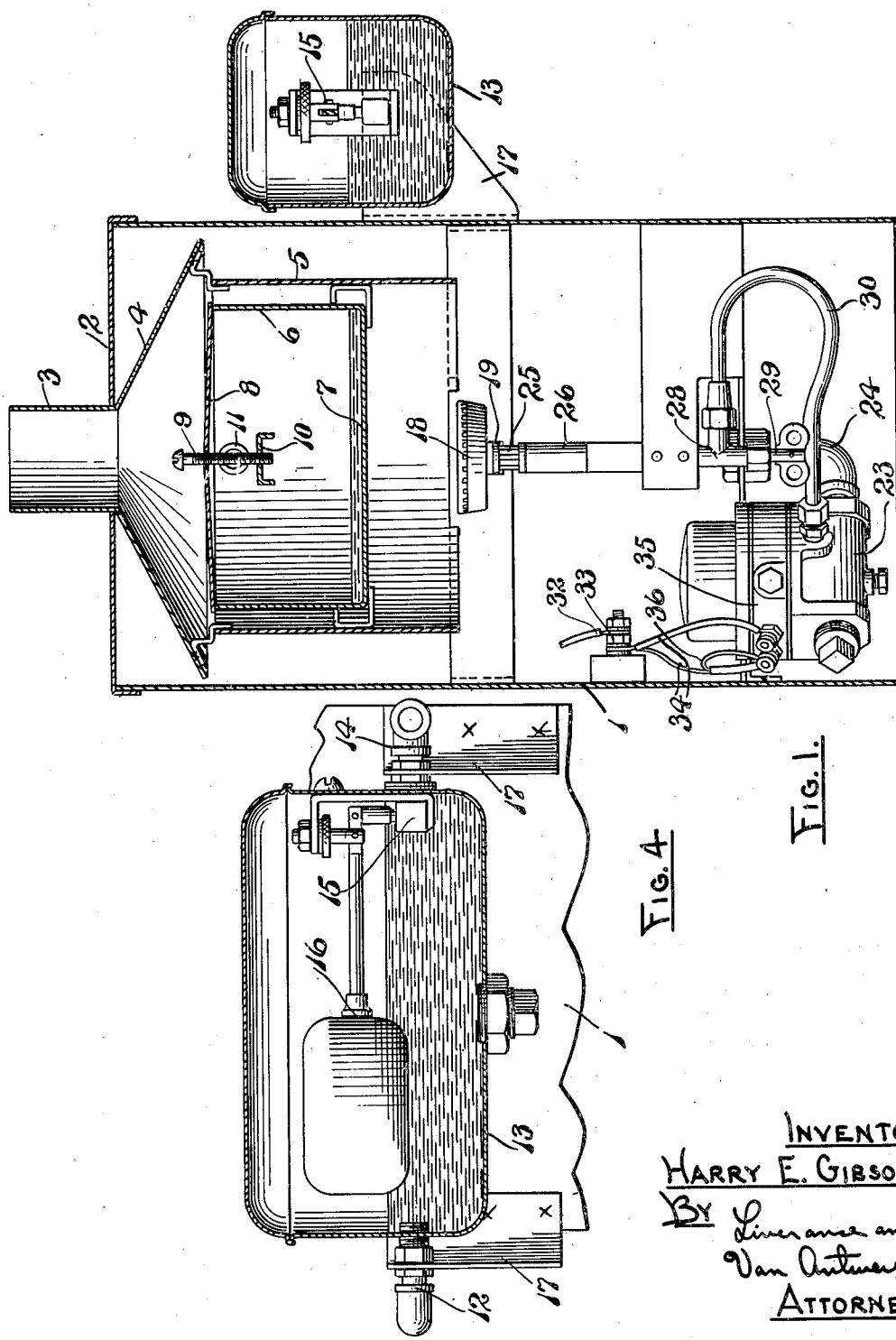
INVENTOR
HARRY E. GIBSON
BY Liverance and
Van Antwerp
ATTORNEYS

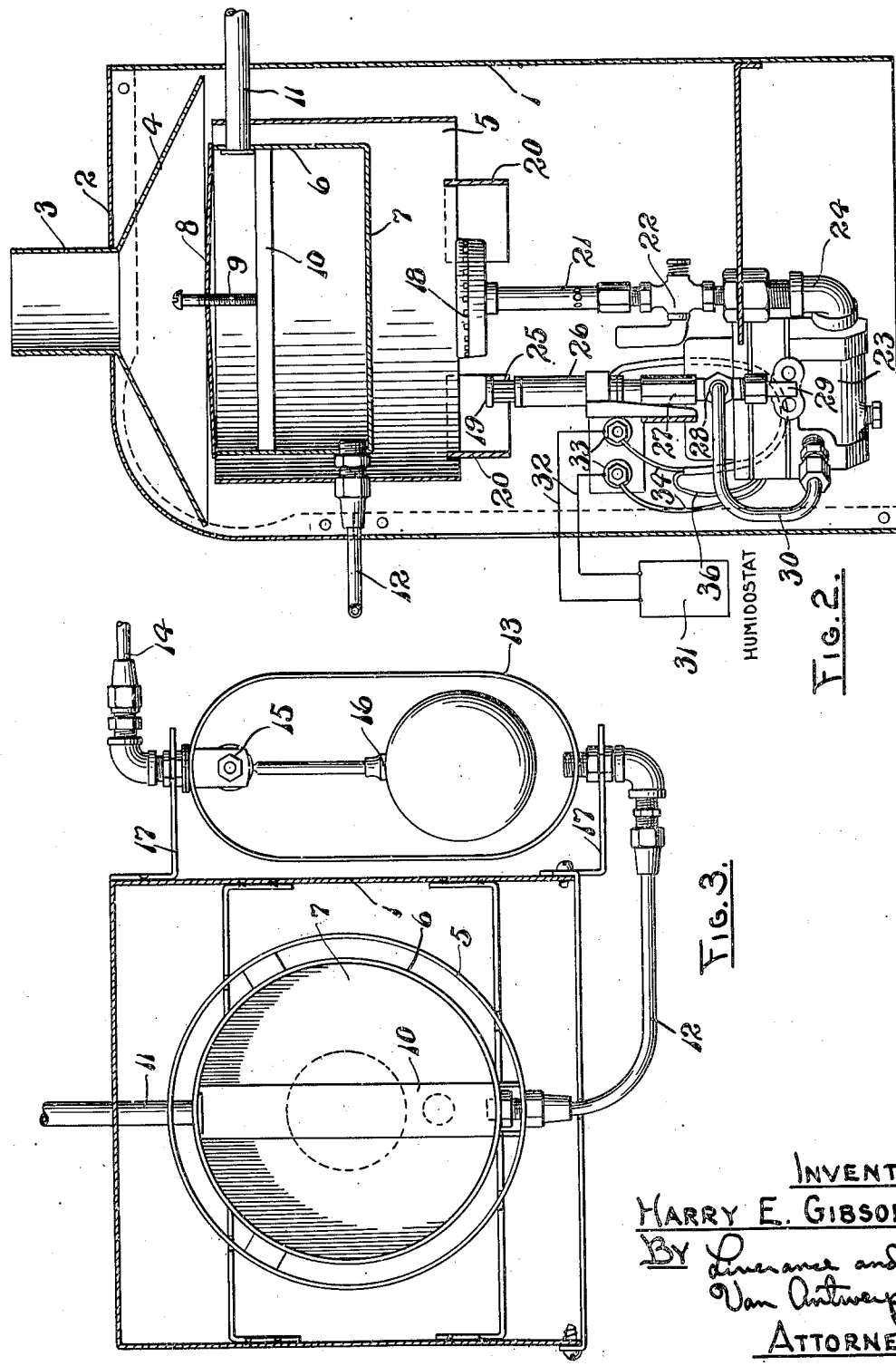

Patented Sept. 13, 1949

2,481,738

UNITED STATES PATENT OFFICE 2,481,738

HUMIDIFIER

Harry E. Gibson, Muskegon, Mich.

Application January 26, 1948, Serial No. 4,341

4 Claims. (Cl. 236—44)

This invention is concerned with a novel and very practical and useful humidifier to supply a room or building with water vapor, and which is automatically operable upon the relative humidity of the air within a room or building falling below a preselected amount. Upon this occurring the humidifier of my invention is rendered operable to vaporize water to supply the enclosed room or building space with additional vapor until the desired degree of humidity has been reached.

It is an object and purpose of the present invention to provide a humidifying apparatus by which the results mentioned are attained in a fully satisfactory manner.

The invention may be understood from the following description, taken in connection with the accompanying drawings, in which, Fig. 1 is a partial vertical section and elevation through the humidifier of my invention, Fig. 2 is a similar vertical section in a plane at right angles to the section shown in Fig. 1, Fig. 3 is a plan and partial horizontal section through the upper part of the humidifier, and Fig. 4 is a longitudinal section through the water supply control apparatus which is used.

Like reference characters refer to like parts in the different figures of the drawings.

In the structure disclosed, a housing having vertical walls 1 and a top 2, preferably of sheet metal parts which may be riveted or otherwise secured together, is provided. Through the generally central portion of the top 2 a short length of pipe 3 extends, which is connected at its lower end immediately below the top 2 with an inverted funnel 4 of a generally conical form. The funnel is located over a cylinder 5 which is in the upper part of the housing 1 and which is open at both ends, its upper end being closely adjacent the lower side of the inverted funnel 4.

Within the upper portion of the cylinder 5 a cylindrical pan having walls 6 and a horizontal bottom 7 is located, its upper edges being substantially flush with the upper end of the cylinder 5. The receptacle thus provided is closed by a cover 8 through the center of which a screw 9 passes and threads into a horizontal bar 10 extending between diametrically opposed sides of the wall 6. The cover has a central opening through which the screw 9 freely passes, and may lift to permit escape of steam if, as later described, the water in the pan or receptacle is too strongly heated. Water is conducted through a pipe 12 to the lower portion of the receptacle described, emptying thereinto immediately above the bottom 7, and water vapor leaves said receptacle through an outlet pipe 11 and may be conducted to any enclosed space such as a room or building, the air of which is to be conditioned as to humidity.

A constant supply of water is provided from a float receptacle 13 which has a bottom and vertical sides and a separable top closure. Water comes to the receptacle through a pipe 14, connected with water mains under pressure or a pressure tank or other source for continuous supply of water, and flows into the receptacle 13 in accordance with the automatic operation of a valve 15 which is controlled by a float 16, the water within the receptacle 13 being maintained at the same level, and at a level, as shown in Fig. 1, such that the water above the bottom 7 of the water receiving receptacle within the housing 1 is of a shallow depth. The valve and float control for automatic opening of the valve when the float lowers beyond a predetermined position, and closing the valve when the float is lifted by the water to a second position, need not be described in detail as it is, specifically, a well known means for controlling the entrance of water into a tank and stopping further entrance when the water has reached a predetermined height therein. The receptacle or tank 13 is mounted at a side of the housing 1 by suitable brackets 17 as shown.

At the lower end and centrally of the cylinder 15 below the bottom 7, a burner 18 for gaseous fuel is located and, adjacent one side thereof, a pilot light structure 19 is mounted so that when fuel is supplied to the burner 18, it is lighted by the pilot light. Said burner and pilot light are located within guards 20 connected with the cylinder 5 to safeguard, as far as possible, against currents or the like either extinguishing or directing the flame of the burning fuel of either the burner or the pilot light. The burner 18 is at the upper end of a vertical pipe 21 which conducts gaseous fuel to it, in which a shut-off valve, manually operable, at 22 is located, the conduit connecting with the lower part 23 of a part of the gaseous fuel conduit, such connection being by a coupling 24. When gas is supplied and passes through the hollow housing 23 and with the valve 22 in open position, fuel is supplied to the burner 18. When the burner is operating, water above the bottom 7 of the receptacle described is heated and vaporized.

The pilot at 19 is at the upper end of a thermocouple 25 by which a continuous generation of electricity occurs during all of the time that the pilot light is lighted. Such electricity provides a potential for current in an electric circuit, in which a winding 26 is included. A vertical tubular conduit indicated generally at 27 supplies fuel for the pilot light and has at its lower portion a T-coupling 28 associated with which is a manually operable key 29 below it which operates a valve within the coupling 28 to open or close the conduit so that gaseous fuel carried through the tubular connection 30 will supply the pilot light all of the time that the valve is open. The valve, controlled by the key 29, is open whenever the humidifier is in operation and is key operated only to close it at times when it is not to be used. The tubular connection at 30 is in direct connection with the gaseous fuel supply.

Within the room or building space which is to be conditioned as to water vapor therein, a humidistat 31 is installed. It includes a make and break switch for an electric circuit, closing the circuit upon the humidity being below a predetermined desired amount and opening it when the air within the space is sufficiently humid. Two circuit wires 32 lead from the humidostat to binding posts 33 carried at the inner side of the housing 1 from which two wires 34 lead, one of them to the thermocouple 26 and the other to an electrically controlled valve within the housing 35. There are two binding posts connected with the housing as shown in Fig. 1, to one of which one of said wires 34 is connected and a wire 36 leads from the other to the thermocouple for completing an electric circuit when the switch controlled by the humidostat is closed.

Upon closure of said circuit a control valve for the flow of gaseous fluid to the burner 18 is opened, said valve being within the housing 35. When the humidostat switch is open upon attainment of a desired relative humidity within the space which is supplied with water vapor, the valve within the housing 35 is closed and the passage of gaseous fuel to the burner 18 stopped. The detail of the interior structure of the electrically controlled valve within the housing 35 is well known and need not be described, as in itself it is not new.

From the foregoing it will be apparent that automatically whenever the humidity within the enclosed space which is to be properly conditioned falls below that desired, the supply of gaseous fuel to the burner 18 is turned on, the fuel is lighted by the pilot light and water above the bottom 7 within the water receptacle within the housing 1 is heated, whereupon water vapor is conducted through the pipe 11 to the room or building space. When the humidity has reached its desired amount, the humidostat, which is affected by the humidity within the room, interrupts the current and the flow of gaseous fuel to the burner 18 is stopped, and will not again take place until the humidity reduces to the predetermined lower amount, reaching of which actuates the humidostat to again close the circuit. The provision of electric potential through the thermocouple is attained by the continuously burning pilot which supplies heat for that purpose.

The construction is very practical and useful and has proved to be very satisfactory.

The invention is defined in the appended claims and is to be considered comprehensive of all forms of structure coming within their scope.

I claim:

1. In a humidifier, a receptacle for holding water, means for supplying water to the receptacle to maintain the level of the water substantially constant, an outlet to the receptacle for conveying water vapor to a preselected space the air of which is to be supplied with the vapor, a burner underneath the lower side of the receptacle, a conduit for conducting gaseous fuel to the burner, control means for preventing the flow of gaseous fuel therethrough or for permitting its passage, an electric circuit associated with said control means for operating it for the passage of fuel to the burner when the circuit is closed, a humidostat control for closing and breaking said electric circuit to be located in said space supplied with vapor from the receptacle, said humidostat control opening the circuit when the humidity of said space is below a predetermined amount and closing said circuit upon attainment thereof, said receptacle having an open upper end and a movable cover closing the upper end of the receptacle, said cover being free to move upwardly upon attainment of a predetermined pressure within the receptacle.

2. In a humidifier, a receptacle for holding the water, means for supplying water to the receptacle to maintain the level of the water substantially constant, an outlet to the receptacle for conveying water vapor to a preselected space the air of which is to be supplied with the vapor, a burner underneath the lower side of the receptacle, a conduit for conducting gaseous fuel to the burner, control means for preventing the flow of gaseous fuel therethrough or for permitting its passage, an electric circuit associated with said control means for operating it for the passage of fuel to the burner when the circuit is closed, a humidostat control for closing and breaking said electric circuit to be located in said space supplied with vapor from the receptacle, said humidostat control opening the circuit when the humidity of said space is below a predetermined amount and closing said circuit upon attainment thereof, said receptacle having an open upper end and a movable cover closing the upper end of the receptacle, said cover being free to move upwardly upon attainment of a predetermined pressure within the receptacle, a surrounding housing enclosing said receptacle, burner, fuel carrying conduit to said burner and fuel control means for the conduit, said enclosure having a top, a vertical flue through the top and a downwardly and outwardly extending annular wall over said cover, said wall at its outer edge portions extending outwardly beyond said cover.

3. A vapor supplying apparatus comprising, a water receiving receptacle, means for supplying it with water, conduit means for conducting water vapor therefrom to a preselected space to which the vapor is to be carried, heating means below the receptacle, a conduit connected therewith for carrying fuel thereto, a humidostat adapted to be located in the space to which the water vapor is to be carried, means connected therewith and to said fuel carrying conduit for opening the conduit for passage of fuel when the humidity of said preselected space lowers to a predetermined amount and for closing said conduit against the passage of fuel when said humidity attains a predetermined desired amount, said water receiving receptacle having a horizontal bottom and vertical sides, the bottom being located above the heating means, a cylindrical shell surrounding said receptacle spaced a short distance therefrom and extending below the bottom thereof and substantially to the heating means, a covering enclosure for said receptacle, shell, burner, fuel conduit and fuel control therefor, said enclosure having a top located above the upper end of the receptacle, a vertical flue through said top, and a frustro-conical extension to said flue at its lower end within said housing and over the upper ends of said receptacle and surrounding shell.

4. A vapor supplying apparatus comprising, a water receiving receptacle, means for supplying it with water, conduit means for conducting water vapor therefrom to a preselected space to which the vapor is to be carried, heating means below the receptacle, a conduit connected therewith for carrying fuel thereto, a humidostat adapted to be located in the space to which the water vapor is to be carried, means connected therewith and to said fuel carrying conduit for opening the conduit for passage of fuel when the humidity of said preselected space lowers to a predetermined amount and for closing said conduit against the passage of fuel when said humidity attains a predetermined desired amount, said water receiving receptacle having a horizontal bottom and vertical sides, the bottom being located above the heating means, a cylindrical shell surrounding said receptacle spaced a short distance therefrom and extending below the bottom thereof and substantially to the heating means, a covering enclosure for said receptacle, shell, burner, fuel conduit and fuel control therefor, said enclosure having a top located above the upper end of the receptacle, a vertical flue through said top, a frustro-conical extension to said flue at its lower end within said housing and over the upper ends of said receptacle and surrounding shell, said receptacle having a horizontal bar extending between and connected at its ends to opposite sides of the receptacle, a vertical guide member secured to said bar, and a flat metal cover having a central opening through which said vertical member freely passes, said cover lying over the upper end of said water receiving receptacle and normally resting upon the upper edges thereof.

HARRY E. GIBSON.

REFERENCES CITED

The following references are of record in the file of this patent:

UNITED STATES PATENTS

| Number | Name | Date |
| --- | --- | --- |
| 2,038,773 | Tornquist | Apr. 28, 1936 |
| 2,244,126 | Smith et al. | June 3, 1941 |
| 2,294,694 | Ray | Sept. 1, 1942 |
| 2,354,773 | Ray | Aug. 1, 1944 |